(12) United States Patent
Xu et al.

(10) Patent No.: US 9,176,866 B2
(45) Date of Patent: Nov. 3, 2015

(54) ACTIVE RECYCLING FOR SOLID STATE DRIVE

(71) Applicant: LSI Corporation, San Jose, CA (US)

(72) Inventors: Peng Xu, Shanghai (CN); Lizhao Ma, Shanghai (CN)

(73) Assignee: Seagate Technology LLC, Cupertino, CA (US)

( * ) Notice: Subject to any disclaimer, the term of this patent is extended or adjusted under 35 U.S.C. 154(b) by 172 days.

(21) Appl. No.: 14/080,950

(22) Filed: Nov. 15, 2013

(65) Prior Publication Data

US 2015/0074327 A1    Mar. 12, 2015

(30) Foreign Application Priority Data

Sep. 10, 2013 (CN) .......................... 2013 1 0409598

(51) Int. Cl.
*G06F 12/00* (2006.01)
*G06F 12/02* (2006.01)

(52) U.S. Cl.
CPC ........ *G06F 12/0246* (2013.01); *G06F 12/0253* (2013.01); *G06F 12/0261* (2013.01); *G06F 2212/7205* (2013.01); *G06F 2212/7207* (2013.01); *G06F 2212/7209* (2013.01)

(58) Field of Classification Search
CPC ............ G06F 12/0238; G06F 12/0246; G06F 12/0253; G06F 12/0261; G06F 12/0269; G06F 12/0276; G06F 2212/7205; G06F 2212/7207; G06F 2212/7209
See application file for complete search history.

(56) References Cited

U.S. PATENT DOCUMENTS

2009/0198947 A1\* 8/2009 Khmelnitsky et al. ........ 711/202
2013/0013980 A1    1/2013 Cideciyan et al.

\* cited by examiner

*Primary Examiner* — Shawn X Gu
(74) *Attorney, Agent, or Firm* — Suiter Swantz pc llo

(57) ABSTRACT

A solid state drive and a method for providing active recycling for the solid state drive are disclosed. The solid state drive includes a plurality of blocks and each of the plurality of blocks includes a plurality of pages. The method steps include receiving a read request from a data requester; identifying at least one page containing data requested by the read request; determining whether the at least one page belongs to a block identified for active recycling; writing the at least one page to a different block when the at least one page belongs to the block identified for active recycling; and sending the at least one page to the data requester in response to the read request.

20 Claims, 4 Drawing Sheets

ACTIVE RECYCLING FOR SOLID STATE DRIVE

CROSS-REFERENCE TO RELATED APPLICATIONS

The present application claims priority based on Chinese Application No. 201310409598.5 filed Sep. 10, 2013, the disclosure of which is hereby incorporated by reference in its entirety.

TECHNICAL FIELD

The present invention relates to the field of data storage and particularly to solid state storage devices.

BACKGROUND

A solid state drive (SSD) is a data storage device using integrated circuit assemblies as memory to store data persistently. SSDs have no moving mechanical components, which distinguish them from traditional electromechanical magnetic disks such as hard disk drives or floppy disks. Compared with electromechanical disks, SSDs are typically less susceptible to physical shock, run more quietly, have lower access time, and less latency.

SUMMARY

Accordingly, an embodiment of the present disclosure is directed to a method for providing active recycling for a solid state drive. The solid state drive includes a plurality of blocks and each of the plurality of blocks includes a plurality of pages. The method steps include receiving a read request from a data requester; identifying at least one page containing data requested by the read request; determining whether the at least one page belongs to a block identified for active recycling; writing the at least one page to a different block when the at least one page belongs to the block identified for active recycling; and sending the at least one page to the data requester in response to the read request.

A further embodiment of the present disclosure is directed to a solid state drive. The solid state drive includes a plurality of blocks for providing data storage, wherein each of the plurality of blocks includes a plurality of pages. The solid state drive also includes a controller for controlling operations of the solid state drive, wherein upon receiving a read request from a data requester, the controller is configured to: identify at least one page containing data requested by the read request; determine whether the at least one page belongs to a block identified for active recycling; write the at least one page to a different block when the at least one page belongs to the block identified for active recycling; and send the at least one page to the data requester in response to the read request.

An additional embodiment of the present disclosure is directed to a solid state drive. The solid state drive includes a plurality of blocks for providing data storage, wherein each of the plurality of blocks includes a plurality of pages. The solid state drive also includes a valid page count table for maintaining a valid page count for each of the plurality of blocks of the solid state drive; an active recycle table for identifying a subset of the plurality of blocks considered for active recycling, wherein the subset of the plurality of blocks considered for active recycling is identified based on the valid page count for each of the plurality of blocks; and a controller for controlling operations of the solid state drive. Upon receiving a read request from a data requester, the controller is configured to: identify at least one page containing data requested by the read request; determine whether the at least one page belongs to a block identified in the active recycle table; write the at least one page to a different block when the at least one page belongs to a block identified in the active recycle table; and send the at least one page to the data requester in response to the read request.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION

Reference will now be made in detail to the presently preferred embodiments of the invention, examples of which are illustrated in the accompanying drawings.

A solid state drive (SSD) uses integrated circuit assemblies as memory to store data persistently. For example, flash memory devices (e.g., NAND type flash memory and the like) can be used as the storage media. A NAND flash memory stores information in an array of memory cells made from floating gate transistors. In traditional single-level cell (SLC) devices, each cell stores only one bit of information. Some newer flash memory, known as multi-level cell (MLC) devices, including triple-level cell (TLC) devices, can store more than one bit per cell by choosing between multiple levels of electrical charge to apply to the floating gates of its cells.

A typical flash memory consists of multiple blocks, and each block contains multiple pages. The basic flash memory read/write unit is a page, which is typically 8 KB in an exemplary implementation. In a conventional implementation, before data can be written to a particular page, the page must first be erased, and the erasing process is performed one block at a time. Therefore, when new data needs to be rewritten to a particular page, the entire block containing that particular page must be erased first. It is contemplated that the pages referenced above can be addressed using physical page address schemes or logical page address (LPA) schemes.

Figure 1:
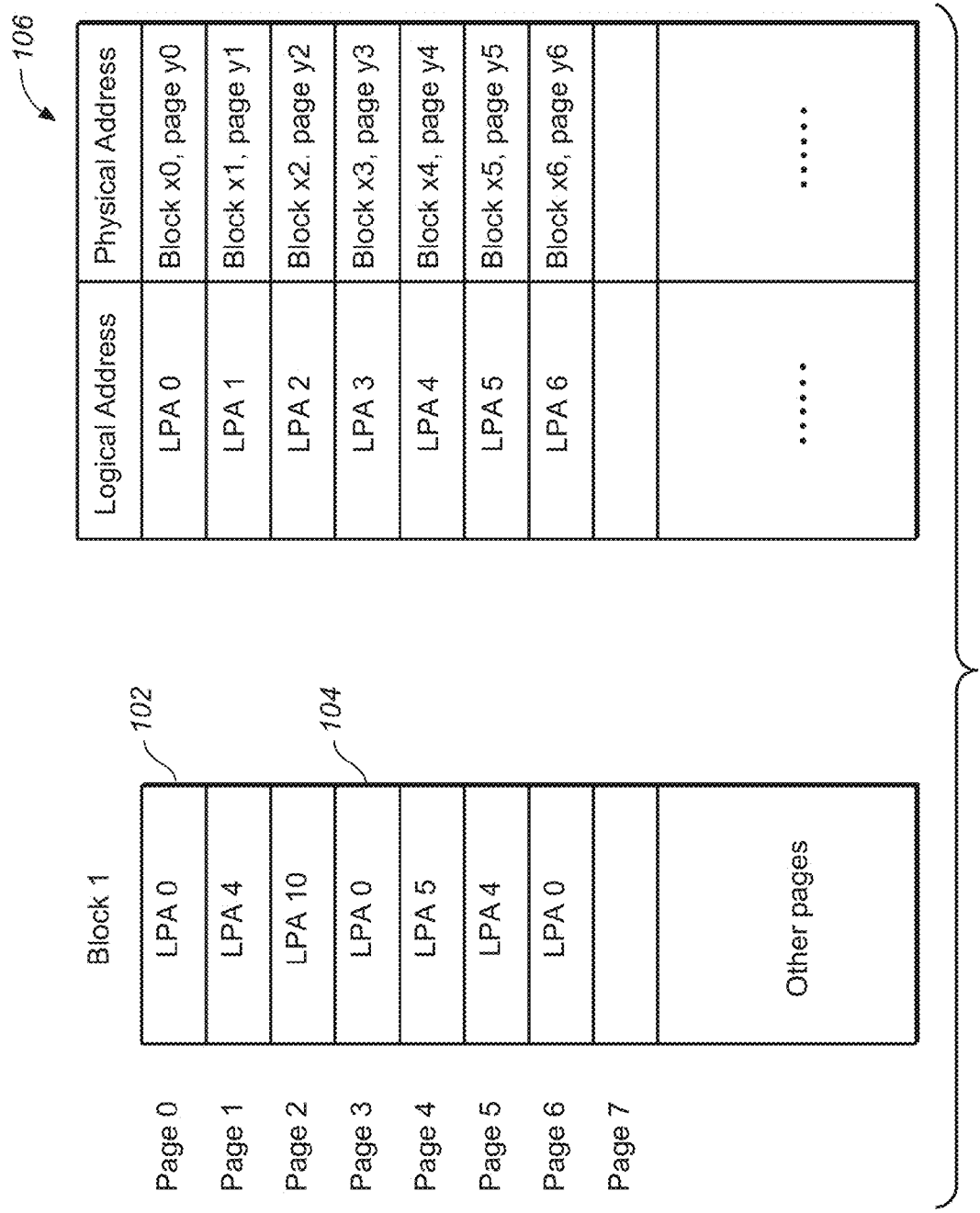
FIG. 1 is an illustration depicting a data block of a solid state drive and an address map utilized by the solid state drive.

FIG. 1 is an illustration depicting a series of write requests issued to a flash memory. For example, LPA 0 is written to Page 0 at instance 102. Subsequently, LPA 4 and LPA 10 are written to Page 1 and Page 2, respectively. If the data requester (e.g., host) needs to write LPA 0 again, the new data needs to be written to another page. In this example, the new data is written to Page 3, referenced by 104 as shown. At this point, LPA 0 is stored in Page 3, and the next time when the host reads LPA 0, the firmware of the SSD knows that it should read from Page 3 instead of Page 0 (i.e., the first instance is no longer valid). In this case, the data contained in Page 0 is called garbage.

It is noted that as the host continues to write data to the SSD, lots of LPAs will be rewritten, and each rewritten LPA will be stored in a different location. The SSD firmware must track the newest locations of the LPAs in order to function properly. For instance, a map 106 may be maintained to record the mapping between the LPAs and their physical address, as shown in FIG. 1. It is also noted that the pages storing data instances that are no longer valid are not usable until they are freed/erased.

Figure 2:
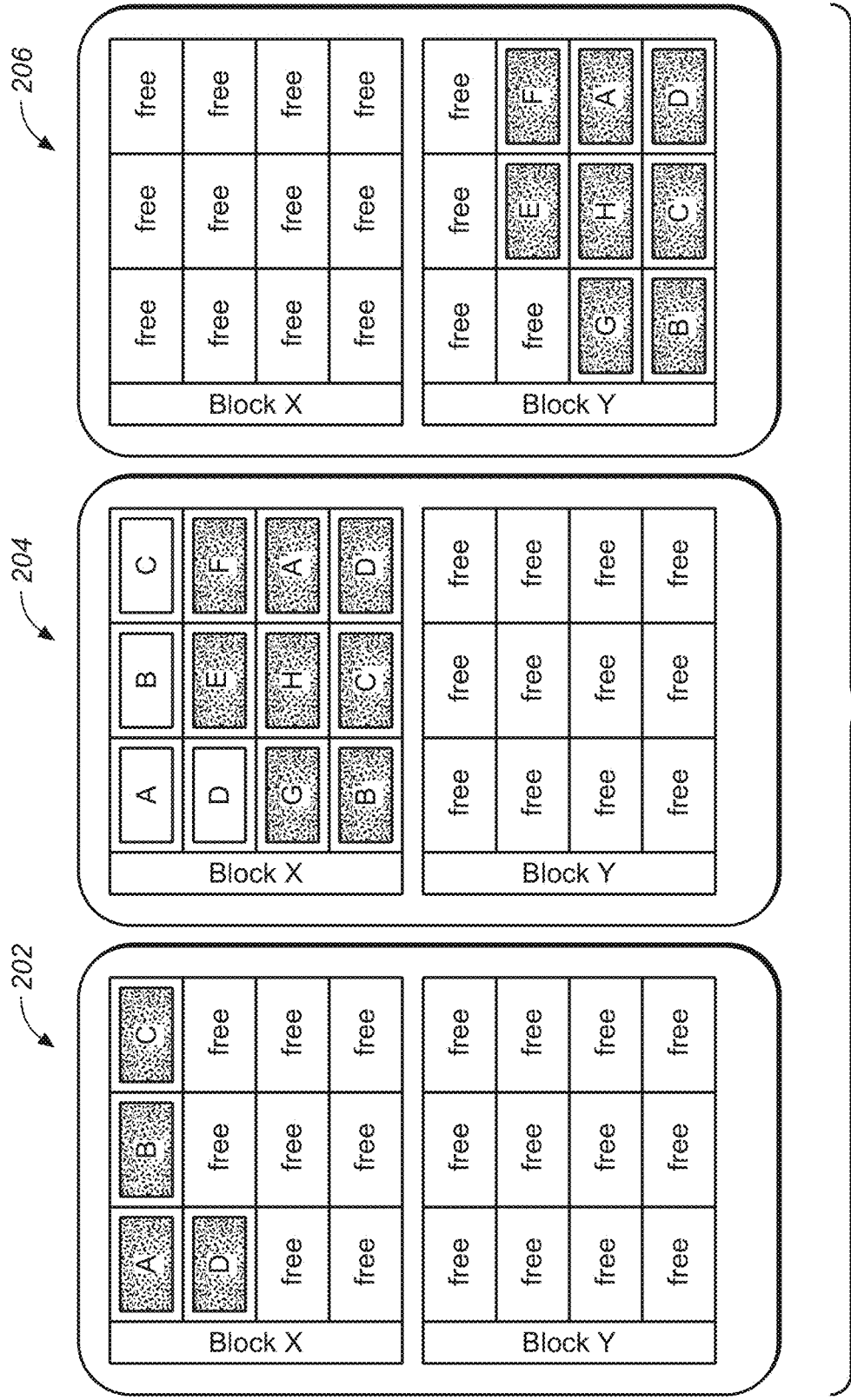
FIG. 2 is an illustration depicting a garbage collection process of a solid state drive.

However, while data is written to the flash memory in units referred to as pages (made up of multiple cells), the flash memory can only be erased in larger units called blocks (made up of multiple pages). FIG. 2 is an illustration depicting this process. As shown in 202, four pages, A through D, are written to Block X. Individual pages can be written to the same block at any time as long as there are free pages available. Subsequently, as shown in 204, suppose four new pages, E through H, and four replacement pages, A' through D', are written to Block X. The original Pages A through D are now invalid (contain stale data), but they cannot be overwritten until the entire block is erased, using a process referred to as garbage collection shown in 206. More specifically, in order to write the pages with stale data (e.g., A through D), all valid pages (e.g., E through H and A' through D') need to be read and written to a new block (e.g., Block Y) first, and Block X can then be erased. It is noted that needing to read all pages from a source block and then write the valid pages to a new block is resource- and time-consuming.

Embodiments of the present disclosure are directed to methods and systems for providing active recycling for solid state drives. More specifically, data is conditionally recycled as a part of the response to a read command from the host. If a particular page currently being requested by the host satisfies certain conditions, the SSD can read the data of that particular page and also rewrite the page to another block, providing an active recycling process that consumes less resource and processing time.

In accordance with one embodiment of the present disclosure, the SSD firmware maintains a record of valid page count for each block in the SSD. This record can be maintained in data structures such as a table or the like, referred to as the valid page count (VPC) table. Each time a write request for a particular page is received, the SSD firmware/controller will first determine whether this page has been written before. If it has been written before, the SSD firmware will find the block that contain this particular page and subtract the valid page count of this block in the VPC table by 1. The SSD firmware then writes this page to a new block, and creates a new VPC entry in the VPC table to track the valid page count of this new block.

Figure 3:
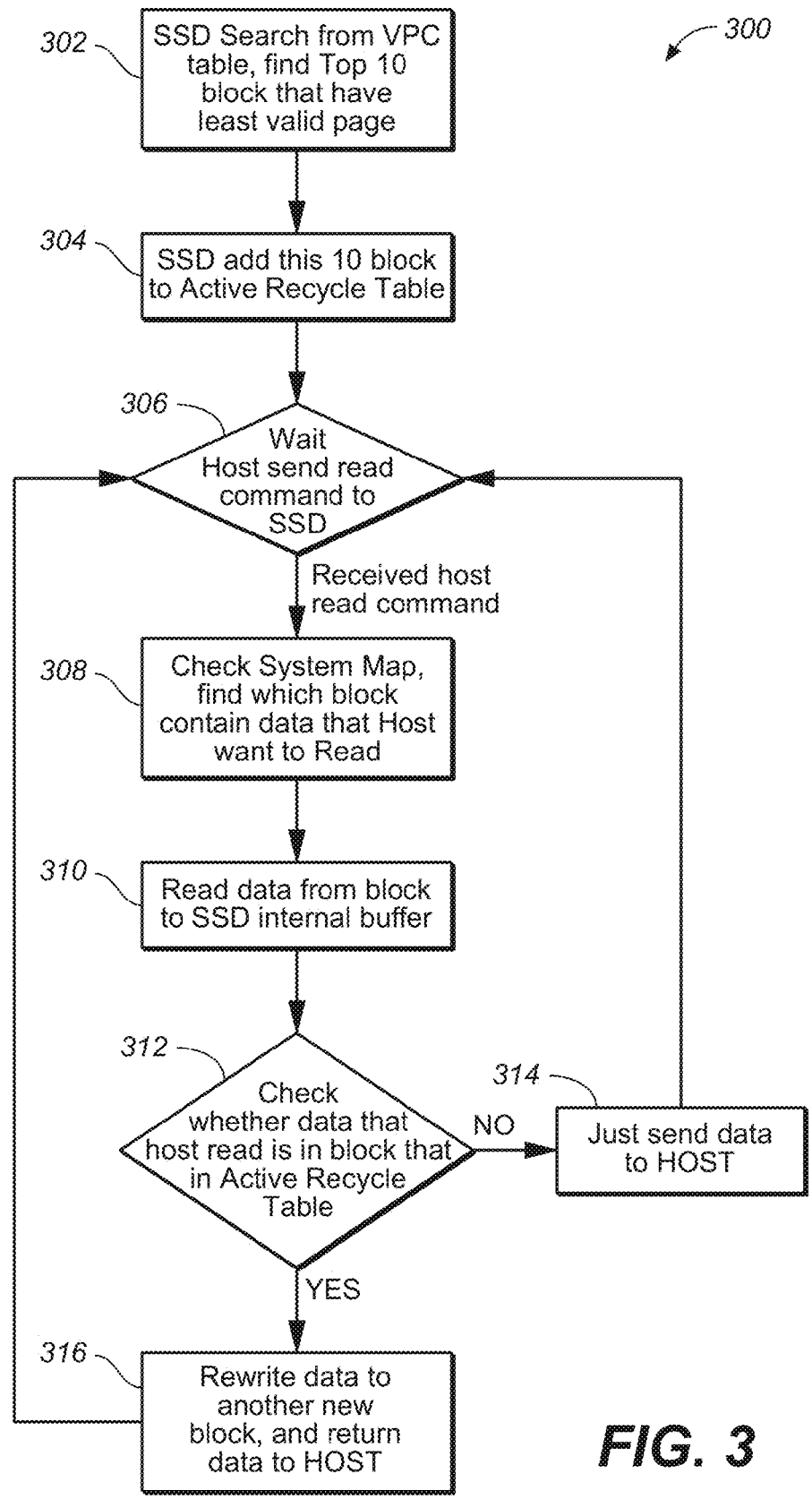
FIG. 3 is a flow diagram illustrating a method for providing active recycling for a solid state drive.
Figure 4:
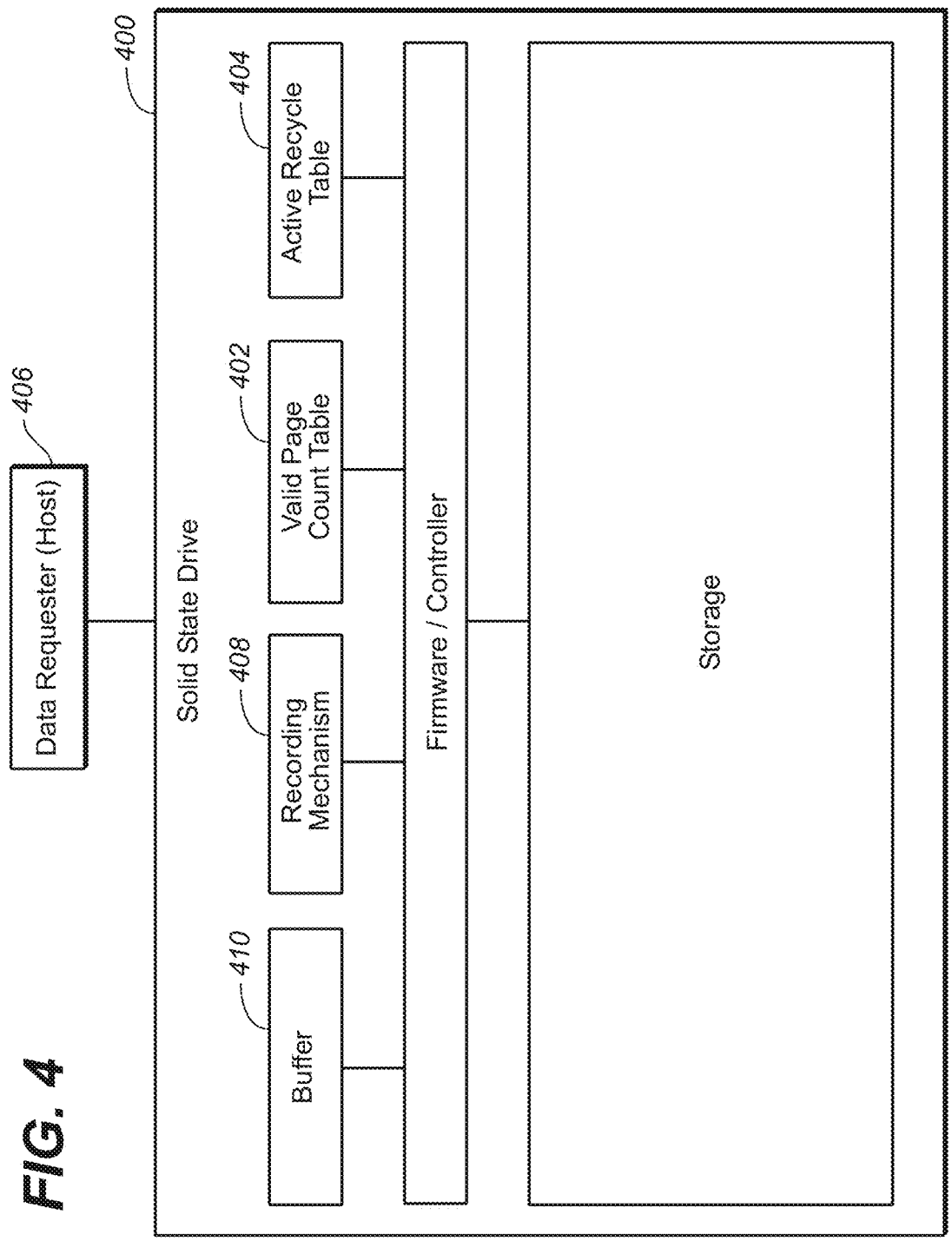
FIG. 4 is a block diagram depicting the solid state drive of FIG. 3.

Referring generally to FIGS. 3 and 4. FIG. 3 is a flow diagram illustrating a method 300 for providing active recycling for a SSD, and FIG. 4 is a block diagram illustrating the SSD 400 in accordance with one embodiment of the present disclosure. Step 302 first searches from the VPC table 402 to find a predetermined number of blocks that have the least number of valid pages. Subsequently, the blocks that have the least number of valid pages are added to an active recycle table 404 in step 304. In an exemplary embodiment, the predetermined number of blocks to search for is 10. It is understood, however, that this number may differ without departing from the spirit and scope of the present disclosure. Alternatively, step 302 can search the VPC table 402 to find the blocks having the number of valid pages below a certain threshold and add such blocks to the active recycle table 404. It is contemplated that various other alternative techniques may be utilized to determine which blocks need to be added to the active recycle table without departing from the spirit and scope of the present disclosure.

Step 306 then waits for a read request from a data requester (e.g., a host device) 406. Upon receiving the read request, step 308 locates the SSD block that contains the data requested by the host, and step 310 retrieves the requested data from the SSD block. Prior to returning the retrieved data to the host, step 312 checks whether the block that contains the retrieved data is listed in the active recycle table 404. If the block that contains the retrieved data is not in the active recycle table, step 314 can simply return the retrieved data to the host. On the other hand, if the block that contains the retrieved data is in the active recycle table, active recycling process is invoked in step 316.

The active recycling process in accordance with one embodiment of the present disclosure is implemented by writing the page containing the retrieved data to another block as a part of the response to the read request. That is, the retrieved data is not only sent back to the host, but also written to another block (referred to as the destination block) that is different from the source block. In this manner, the SSD have successfully processed the host read command and simultaneously recycled one page from the source block. It is noted that this active recycling process is performed on a source block that is low on the number of valid pages (based on the fact that it appears in the active recycle table). Therefore, when the source block needs to be erased, the garbage collection process does not need to read and write the page that has already been written to the destination block, reducing the total processing time.

It is contemplated that a recording mechanism 408 can be utilized to provide mapping between a logical addressing scheme and the physical addresses to locate the SSD block that contains the requested data. The recording mechanism 408 can also be utilized to track the status of each page (e.g., free, stale or the like). In addition, a new status can be utilized to identify that a page in a source block has already been rewritten to another destination block, allowing the garbage collection process to skip this page when the source block is to be freed/erased.

It is also contemplated that a buffer 410 can be utilized to buffer the retrieved data while steps 312, 314 and 316 are being carried out. Subsequently, steps 314 or 316 can use the buffered data instead of having to access the data block again to retrieve the data.

It is further contemplated that the data structures such as the map and table referenced in the description above are merely exemplary. Various data structures such as lists and the like can also be utilized for recording and tracking purposes without departing from the spirit and scope of the present disclosure.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for providing active recycling for a solid state drive, the solid state drive including a plurality of blocks and each of the plurality of blocks including a plurality of pages, the method comprising:
   receiving a read request from a data requester;
   identifying at least one page containing data requested by the read request;
   determining whether the at least one page belongs to a block identified for active recycling;
   writing the at least one page to a different block when the at least one page belongs to the block identified for active recycling; and
   sending the at least one page to the data requester in response to the read request.

2. The method of claim 1, further comprising:
   maintaining a valid page count for each of the plurality of blocks of the solid state drive.

3. The method of claim 2, further comprising:
   identifying a predetermined number of blocks for active recycling based on the valid page count for each of the plurality of blocks.

4. The method of claim 3, wherein a block is identified for active recycling when said block is among the predetermined number of blocks having least number of valid pages.

5. The method of claim 2, wherein a block is identified for active recycling when the valid page count for said block is below a predefined threshold.

6. The method of claim 1, wherein the different block where the at least one page is written to is not identified for active recycling.

7. The method of claim 1, wherein the different block where the at least one page is written to is a new block.

8. A solid state drive, comprising:
   a plurality of blocks for providing data storage, wherein each of the plurality of blocks includes a plurality of pages; and
   a controller for controlling operations of the solid state drive, wherein upon receiving a read request from a data requester, the controller is configured to:
      identify at least one page containing data requested by the read request;
      determine whether the at least one page belongs to a block identified for active recycling;
      write the at least one page to a different block when the at least one page belongs to the block identified for active recycling; and
      send the at least one page to the data requester in response to the read request.

9. The solid state drive of claim 8, further comprising:
   a valid page count table for maintaining a valid page count for each of the plurality of blocks of the solid state drive.

10. The solid state drive of claim 9, further comprising:
    an active recycle table for identifying a subset of the plurality of blocks considered for active recycling, wherein the subset of the plurality of blocks considered for active recycling is identified based on the valid page count for each of the plurality of blocks.

11. The solid state drive of claim 10, wherein a block is identified for active recycling when said block is among a predetermined number of blocks having least number of valid pages.

12. The solid state drive of claim 10, wherein a block is identified for active recycling when the valid page count for said block is below a predefined threshold.

13. The solid state drive of claim 8, wherein the different block where the at least one page is written to is not identified for active recycling.

14. The solid state drive of claim 8, wherein the different block where the at least one page is written to is a new block.

15. The solid state drive of claim 8, further comprising:
    a recording mechanism for tracking status of the at least one page, wherein the status of the at least one page indicates the at least one page is to be skipped during a garbage collection process after the at least one page is written to the different block.

16. The solid state drive of claim 8, further comprising:
    a buffer for buffering the at least one page containing data requested by the read request.

17. A solid state drive, comprising:
    a plurality of blocks for providing data storage, wherein each of the plurality of blocks includes a plurality of pages;
    a valid page count table for maintaining a valid page count for each of the plurality of blocks of the solid state drive;
    an active recycle table for identifying a subset of the plurality of blocks considered for active recycling, wherein the subset of the plurality of blocks considered for active recycling is identified based on the valid page count for each of the plurality of blocks; and
    a controller for controlling operations of the solid state drive, wherein upon receiving a read request from a data requester, the controller is configured to:
       identify at least one page containing data requested by the read request;
       determine whether the at least one page belongs to a block identified in the active recycle table;
       write the at least one page to a different block when the at least one page belongs to a block identified in the active recycle table; and
       send the at least one page to the data requester in response to the read request.

18. The solid state drive of claim 17, wherein a block is identified for active recycling when said block is among a predetermined number of blocks having least number of valid pages.

19. The solid state drive of claim 17, wherein a block is identified for active recycling when the valid page count for said block is below a predefined threshold.

20. The solid state drive of claim 17, further comprising:
    a recording mechanism for tracking status of the at least one page, wherein the status of the at least one page indicates the at least one page is to be skipped during a garbage collection process after the at least one page is written to the different block.

* * * * *